(12) United States Patent
Lee

(10) Patent No.: US 8,369,545 B2
(45) Date of Patent: Feb. 5, 2013

(54) FLEXIBLE LUMINESCENT ELECTRO-ACOUSTIC TRANSDUCER AND ELECTRONIC DEVICE USING THE SAME

(75) Inventor: Fang Ching Lee, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 618 days.

(21) Appl. No.: 12/632,012

(22) Filed: Dec. 7, 2009

(65) Prior Publication Data

US 2010/0166247 A1    Jul. 1, 2010

(30) Foreign Application Priority Data

Dec. 31, 2008  (TW) ................................ 97151579 A

(51) Int. Cl.
H04R 25/00 (2006.01)
H01J 1/62 (2006.01)
H01J 63/04 (2006.01)

(52) U.S. Cl. ........ 381/191; 381/150; 381/190; 313/483; 313/506; 313/508

(58) Field of Classification Search ................... 381/150, 381/190–191
See application file for complete search history.

(56) References Cited

U.S. PATENT DOCUMENTS

| | | | |
|---|---|---|---|
| 3,084,229 A | 4/1963 | Selsted et al. | |
| 3,711,941 A | 1/1973 | Sessler et al. | |
| 3,935,397 A | 1/1976 | West | |
| 3,980,838 A | 9/1976 | Yakushiji et al. | |
| 4,041,446 A | 8/1977 | Liebermann | |
| 4,160,882 A | 7/1979 | Driver | |
| 4,306,166 A | 12/1981 | Quandt | |
| 5,247,490 A | 9/1993 | Goepel et al. | |
| 6,496,586 B1 | 12/2002 | Hayes et al. | |
| 6,806,593 B2 | 10/2004 | Tai et al. | |
| 6,888,947 B2 | 5/2005 | Takeshima et al. | |
| 7,091,650 B2 | 8/2006 | Xu et al. | |
| 7,329,933 B2 | 2/2008 | Zhe et al. | |
| 7,583,811 B2 * | 9/2009 | Wada ............................ | 381/388 |
| 2001/0004398 A1 | 6/2001 | Omata et al. | |
| 2004/0062406 A1 | 4/2004 | Sakamoto | |
| 2005/0122043 A1 | 6/2005 | Kato et al. | |
| 2005/0254673 A1 | 11/2005 | Hsieh et al. | |
| 2006/0205244 A1 | 9/2006 | Shigeno et al. | |
| 2007/0029899 A1 * | 2/2007 | Matsuzawa ................... | 310/334 |
| 2008/0123876 A1 | 5/2008 | Sato et al. | |
| 2008/0232088 A1 | 9/2008 | Hente | |

(Continued)

FOREIGN PATENT DOCUMENTS

CN    1653850 A    8/2005
CN    2829267 Y    10/2006

(Continued)

OTHER PUBLICATIONS

JP Office Action for 2009-292031 dated Sep. 7, 2011.

*Primary Examiner* — Yuwen Pan
*Assistant Examiner* — Matthew Eason

(57) ABSTRACT

An electro-acoustic transducer according to the present invention is provided. The electro-acoustic transducer includes a conductive plate with a plurality of openings, an electret diaphragm and a fluorescent layer. The electret diaphragm is positioned on the conductive plate and has a film body and an electrode layer. The film body has static charges carried and the electrode layer is formed on the upper surface of the film body. The fluorescent layer is positioned between the lower surface of the film body and the conductive plate.

20 Claims, 7 Drawing Sheets

U.S. PATENT DOCUMENTS

| | | |
|---|---|---|
| 2009/0039763 A1 * | 2/2009 | Chien et al. .................. 313/503 |
| 2009/0060233 A1 | 3/2009 | Liou et al. |
| 2009/0060234 A1 | 3/2009 | Liou et al. |
| 2011/0255721 A1 | 10/2011 | Chen et al. |

FOREIGN PATENT DOCUMENTS

| | | |
|---|---|---|
| EP | 0810676 | 12/1997 |
| EP | 1722596 A1 | 11/2006 |
| GB | 2343811 | 5/2000 |
| JP | 5127318 | 3/1976 |
| JP | 53006637 A | 1/1978 |
| JP | 10191496 A | 7/1998 |
| JP | 2004166262 A | 6/2004 |
| JP | 2004328055 A | 11/2004 |
| JP | 2005158371 A | 6/2005 |
| JP | 20076459 A | 1/2007 |
| JP | 2007110382 A | 4/2007 |
| JP | 20085439 A | 1/2008 |
| TW | 1294250 | 7/2007 |
| TW | 1293233 | 2/2008 |
| WO | 0027166 A2 | 5/2000 |
| WO | 2004062318 A1 | 7/2004 |
| WO | 2006118680 A1 | 11/2006 |
| WO | 2007023409 | 3/2007 |
| WO | 2008035878 | 3/2008 |

* cited by examiner

FLEXIBLE LUMINESCENT ELECTRO-ACOUSTIC TRANSDUCER AND ELECTRONIC DEVICE USING THE SAME

CROSS REFERENCE TO RELATED APPLICATION

This application claims the priority benefit of Taiwan Patent Application Serial Number 097151579 filed Dec. 31, 2008, the full disclosure of which is incorporated herein by reference.

BACKGROUND OF THE INVENTION

1. Field of the Invention

The invention relates to an electro-acoustic transducer and an electronic device using the same, and more particularly, to a flexible luminescent electro-acoustic transducer and an electronic device using the same.

2. Description of the Related Art

Flexible luminescent boards can generate light due to possession of a phosphor material. When the phosphor material is driven by a high voltage, the energy levels of electrons inside the phosphor material will change to cause a fluorescent emission. Referring to FIG. 1, a conventional flexible luminescent board 100 includes a fluorescent layer 130 and a dielectric layer 140 positioned under the fluorescent layer 130. A rear electrode 150 is positioned under the dielectric layer 140 and a front transparent electrode 120 is positioned above the fluorescent layer 130. A front transparent protective cover 110 is positioned above the front transparent electrode 120 and a rear protective cover 160 is positioned under the rear electrode 150. In order to make the luminescent board 100 generate a fluorescent emission, it is necessary to apply an enough voltage to the electrodes 120 and 150. When a voltage is applied, an electric filed will be built up between the electrodes 120 and 150 accordingly. The electrons inside the fluorescent material of the fluorescent layer 130 can therefore acquire enough energy to make a transition from a low energy state to a high energy state. When the electrons return to the low energy state, they will generate fluorescent light accordingly. The light can travel through the front transparent electrode 120 and front protective cover 110 to leave the luminescent board 100. Although the above luminescent board 100 can generate a fluorescent emission, it is incapable of generating sound.

Piezoelectric loudspeakers or receivers are ones that have their diaphragms made of piezoelectric material. Alternatively, the diaphragms are formed by attaching the piezoelectric material to a flexible substrate. When an external electrical signal is applied to the piezoelectric sheet, the electrical signals will stimulate the piezoelectric material to cause a deformation. The deformation of the diaphragm induced by the piezoelectric material can push the air to make sound. Referring to FIG. 2, it illustrates a conventional piezoelectric loudspeaker 200. An electrode 220 is positioned on the flexible substrate 210 of the loudspeaker 200 and a piezoelectric layer 230 is positioned on the electrode 220. A counter electrode 240 corresponding to the electrode 220 is positioned on the piezoelectric layer 230. When an electrical signal is applied to the electrodes 220, 240, the electrical signals will stimulate the piezoelectric layer 230 to cause a deformation. If the electrical signal applied to the electrodes 220, 240 alternately changes, the piezoelectric layer 230 and substrate 210 will be induced to vibrate to make sound. Although the above loudspeaker 200 can generate sound, it is incapable of generating light.

The above luminescent board and loudspeaker are independent to each other. It is required to provide individual space for each element when these elements are equipped to a same device.

Accordingly, there exists a need to provide a device with the function of making sound and generating light to solve the above-mentioned problems.

SUMMARY OF THE INVENTION

The present disclosure provides a flexible electro-acoustic transducer that can make sound and generate light simultaneously.

In the first embodiment, the electro-acoustic transducer includes a first conductive plate as an electrode. The first conductive plate has a plurality of through openings and a thickness of 0.1 to 2 mm. A first electret diaphragm is stacked on the first conductive plate and has a thickness of 0.5 to 100 µm. The first electret diaphragm includes a first film body and a first electrode layer formed on the upper surface of the first film body. The first film body is made of dielectric material and has static charges carried. A first fluorescent layer is disposed between the lower surface of the first film body and first conductive plate. The first fluorescent layer has a plurality of through openings respectively opposite to the openings on the first conductive plate. The first fluorescent layer has a thickness of 10 µm to 2 mm and can function as spacers to separate the first electret diaphragm and first conductive plate from each other for a predetermined distance.

In the second embodiment, the electro-acoustic transducer includes all elements of the electro-acoustic transducer in the first embodiment. In addition to the above elements, the electro-acoustic transducer of the present embodiment further includes a second electret diaphragm with a thickness of 0.5 to 100 µm. The second electret diaphragm includes a second film body and a second electrode layer formed on the lower surface of the second film body. The second film body is made of dielectric material and has static charges carried. An isolation layer made of porous air-permeable membrane is disposed between the first and second electrode layers. A second conductive plate as an electrode is stacked on the second film body and has a plurality of through openings. The second conductive plate has a thickness of 0.1 to 2 mm and is made of a metal mesh or transparent conductive film, such as an indium tin oxide (ITO) film. Furthermore, a second fluorescent layer is disposed between the upper surface of the second film body and the second conductive plate. The second fluorescent layer has a plurality of through openings. The second fluorescent layer has a thickness of 10 µm to 2 mm and can also function as spacers to separate the second electret diaphragm and the second conductive plate from each other for a predetermined distance.

The present invention further provides an electronic device equipped with one of the above flexible electro-acoustic transducers.

In the first type of the first embodiment, the electronic device includes a housing having a plurality of through openings extending from the inner surface through to the outer surface thereof. The electro-acoustic transducer in the first embodiment is disposed on the inner surface of the housing, wherein the first conductive plate is disposed on the inner surface of the housing and the first electret diaphragm is disposed on the first conductive plate. A plurality of spacers is positioned between the first conductive plate and the inner surface of the housing to prevent the first conductive plate from movement to cause damage on the housing.

In the second type of the first embodiment, the electronic device includes a housing having a plurality of through openings extending from the inner surface through to the outer surface thereof. The electro-acoustic transducer in the first embodiment is disposed on the inner surface of the housing, wherein the first electret diaphragm is disposed on the inner surface of the housing and the first conductive plate is disposed on the first electret diaphragm. A plurality of spacers is positioned between the first electrode layer and the inner surface of the housing to prevent the first electrode layer from movement to cause damage on the housing.

In the second embodiment, the electronic device includes a housing having a plurality of through openings extending from the inner surface through to the outer surface thereof. The electro-acoustic transducer in the second embodiment is disposed on the inner surface of the housing, wherein the first conductive plate is disposed on the inner surface of the housing and the first electret diaphragm is disposed on the first conductive plate. A plurality of spacers is positioned between the first conductive plate and the inner surface of the housing to prevent the first conductive plate from movement to cause damage on the housing.

In the third embodiment, the electronic device is substantially the same as that in the first type of the first embodiment. The difference between them is that the electronic device of the third embodiment has a conductive layer coated on the inner surface of the housing to replace the conductive plate of the electro-acoustic transducer in the first type of the first embodiment.

In the fourth embodiment, the electronic device is substantially the same as that in the second embodiment. The difference between them is in that the electronic device of the fourth embodiment has a conductive layer coated on the inner surface of the housing to replace the conductive plate of the electro-acoustic transducer in the second embodiment.

According to the present disclosure, the electro-acoustic transducers integrate the function of making sound and generating light together, the available space inside the electronic devices can be increased accordingly. Furthermore, since the electro-acoustic transducers of the present disclosure are comprised of a lot of voice units arranged in an array, their voice performances are better than conventional piezoelectric loudspeakers.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
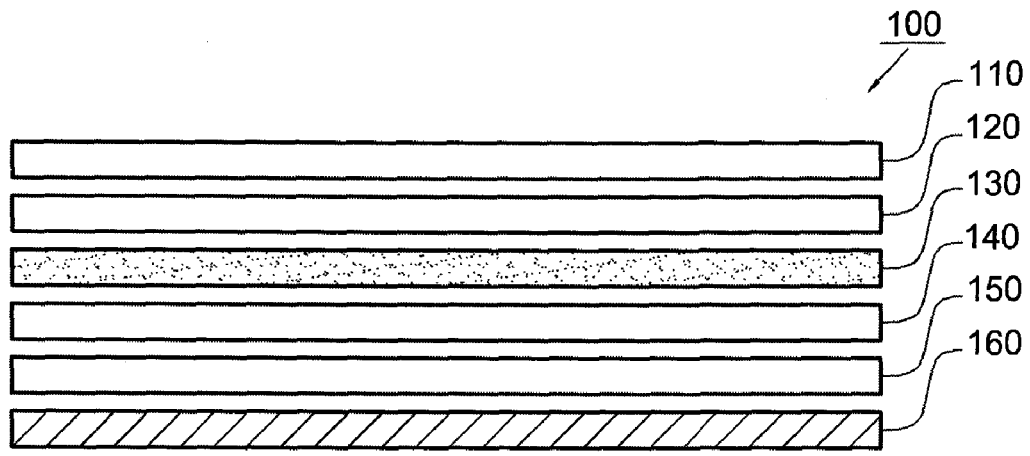
FIG. 1 is a cross-sectional view of a conventional luminescent board.
Figure 2:
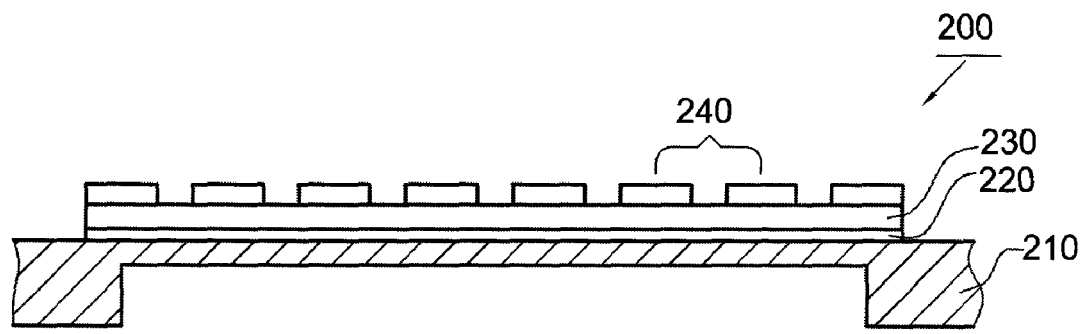
FIG. 2 is a cross-sectional view of a conventional piezoelectric loudspeaker.
Figure 3:
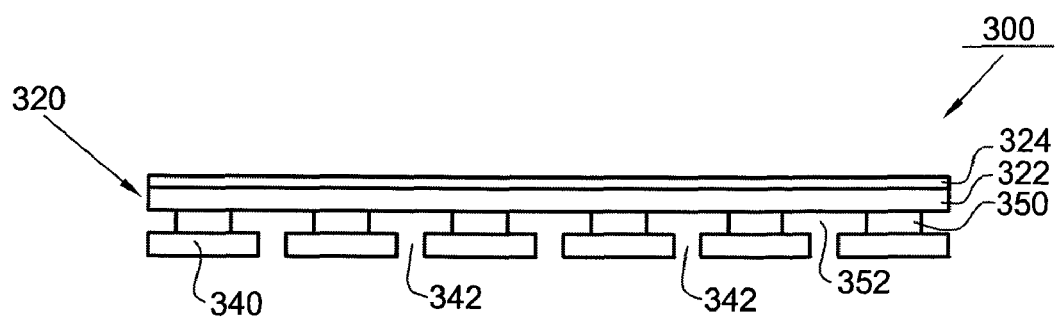
FIG. 3 is a cross-sectional view of the electro-acoustic transducer according to the first embodiment of the present invention.

Referring to FIG. 3, the electro-acoustic transducer 300 according to the first embodiment of the present invention includes a conductive plate 340 as an electrode. The conductive plate 340 has a plurality of through openings 342. The conductive plate 340 has a thickness of 0.1 to 2 mm and is made of a metal mesh or transparent conductive film, such as an indium tin oxide (ITO) film, with openings. An electret diaphragm 320 is stacked on the conductive plate 340 and has a thickness of 0.5 to 100 µm. The electret diaphragm 320 includes a film body 322 and an electrode layer 324 formed on the upper surface of the film body 322. The film body 322 is made of dielectric material and has static charges carried thereon. Furthermore, a fluorescent layer 350 is disposed between the lower surface of the film body 322 and the conductive plate 340. The fluorescent layer 350 has a plurality of through openings 352 respectively opposite to the openings 342 of the conductive plate 340. The fluorescent layer 350 has a thickness of 10 µm to 2 mm and can also function as spacers to separate the electret diaphragm 320 and the conductive plate 340 from each other for a predetermined distance.

In order to make the film body 322 have static charges carried thereon, the original film body 322 having no static charges is required to be subjected to a polarizing process. For example, a corona charging process can be used to polarize the film body 322 to build up static charges therein and thereon after the electrode layer 324 is formed on the film body 322. The material suitable for the film body 322 can be fluorinated ethylene propylene (FEP), Polytetrafluoroethene (PTFE), Polyvinylidene Fluoride (PVDF), silicon dioxide (SiO2) or other fluoride polymers. Furthermore, the edge of the electret diaphragm 320 is required to be fixed to prevent the electret diaphragm 320 from movement. To have the electro-acoustic transducer 300 of the present embodiment work, electrical signals respectively in the same phase with and in an opposite phase to the original sound signal, i.e. differential signals have to be applied to the conductive plate 340 and the electrode layer 324, respectively so that the electret diaphragm 320 is subjected to the Coulomb forces from the conductive plate 340 and the electrode layer 324 to bring about a push-pull effect. The push-pull effect will cause the electret diaphragm 320 to vibrate in accordance with the electrical signals so as to push the air to make sounds.

In addition, the electric field built up between the electrode layer 324 and the conductive plate 340 can provide energy for the fluorescent layer 350 so that the electrons in the fluorescent material of the fluorescent layer 350 can make a transition from a lower energy state to a high energy state. When the electrons return to the low energy state, the fluorescent layer 350 will generate light accordingly. The light can travel through the conductive plate 340 to leave the electro-acoustic transducer 300 so that a user can see the light. As known in the art, the color and intensity of the light generated by the fluorescent layer 350 vary depending on different signal voltage. Furthermore, when the electrode layer 324 and the film body 322 are transparent, for example, the film body 322 is made of transparent FEP, the light generated by the fluorescent layer 350 can travel through the film body 322 and the electrode layer 324 to leave the electro-acoustic transducer 300.

Figure 4:
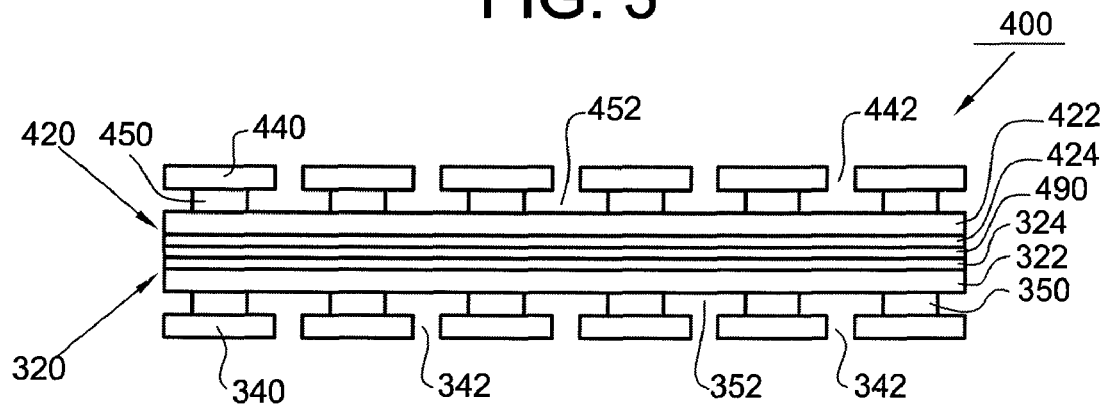
FIG. 4 is a cross-sectional view of the electro-acoustic transducer according to the second embodiment of the present invention.

Referring to FIG. 4, the electro-acoustic transducer 400 according to the second embodiment of the present invention includes all elements configured in the electro-acoustic transducer 300, i.e. the electret diaphragm 320, the conductive plate 340 and the fluorescent layer 350. In addition to the above elements, the electro-acoustic transducer 400 further includes an electret diaphragm 420 with a thickness of 0.5 to 100 μm. The electret diaphragm 420 includes a film body 422 and an electrode layer 424 formed on the lower surface of the film body 422. The film body 422 is made of dielectric material and has static charges carried thereon. An isolation layer 490 made of porous air-permeable membrane is disposed between the electrode layers 324 and 424. A conductive plate 440 functioning as an electrode is stacked on the film body 422 and has a plurality of through openings 442 respectively corresponding to the openings 342. The conductive plate 440 has a thickness of 0.1 to 2 mm and is made of a metal mesh or transparent conductive film, such as an indium tin oxide (ITO) film, with openings. Furthermore, a fluorescent layer 450 is disposed between the upper surface of the film body 422 and the conductive plate 440. The fluorescent layer 450 has a plurality of through openings 452 respectively opposite to the openings 442 on the conductive plate 440. The fluorescent layer 450 has a thickness of 10 μm to 2 mm and can also function as spacers to separate the electret diaphragm 420 and the conductive plate 440 from each other for a predetermined distance.

Similarly, in order to make the film body 422 have static charges carried thereon, the original film body 422 having no static charges is required to be subjected to a polarizing process so as to build up static charges therein and thereon. The material suitable for the film body 422 can also be FEP, PTFE, PVDF, silicon dioxide or other fluoride polymers. Furthermore, the edge of the electret diaphragm 420 is also required to be fixed to prevent the electret diaphragm 420 from movement. To have the electro-acoustic transducer 400 of the present embodiment work, a first electrical signal in the same phase with the original sound signal has to be applied to the conductive plate 440 and the electrode layer 324, and a second electrical signal in an opposite phase to the original sound signal is applied to the electrode layer 424 and conductive plate 340. In this manner, the electret diaphragms 320 and 420 will be subjected to the Coulomb forces from the conductive plate 340 and the electrode layer 324 and from the conductive plate 440 and the electrode layer 424 and vibrate to make sounds in accordance with the first and second electrical signals. The sounds made by the electret diaphragm 320 can travel through the porous isolation layer 490 to leave the electro-acoustic transducer 400. Similarly, the sounds made by the electret diaphragm 420 can travel through the porous isolation layer 490 to leave the electro-acoustic transducer 400. The electro-acoustic transducer 400 with double electret diaphragms can make double sounds (3 dB) than the electro-acoustic transducer 300 with only a single electret diaphragm.

In addition, the electric field built up between the electrode layer 424 and the conductive plate 440 can provide energy for the fluorescent layer 450 to generate light. The light can travel through the conductive plate 440 to leave the electro-acoustic transducer 400. Moreover, when the electrode layer 424, the isolation layer 490 and the film body 422 are all transparent, for example, the film body 422 is made of transparent FEP, the light generated by the fluorescent layer 450 can travel through the film body 422, the electrode layer 424, the isolation layer 490, the electrode layer 324, the film body 322 and the conductive plate 340 in sequence to leave the electro-acoustic transducer 400. Similarly, the light generated by the fluorescent layer 350 can travel through the film body 322, the electrode layer 324, the isolation layer 490, the electrode layer 424, the film body 422 and the conductive plate 440 in sequence to leave the electro-acoustic transducer 400. According to the present invention, the fluorescent layers 350, 450 of the electro-acoustic transducers 300, 400 can be ones that have a plurality of openings 352 and 452 thereon. However, it should be appreciated that the fluorescent layers 350, 450 can be comprised of a plurality of discrete fluorescent spacers 350 and 450, respectively.

Figure 5:
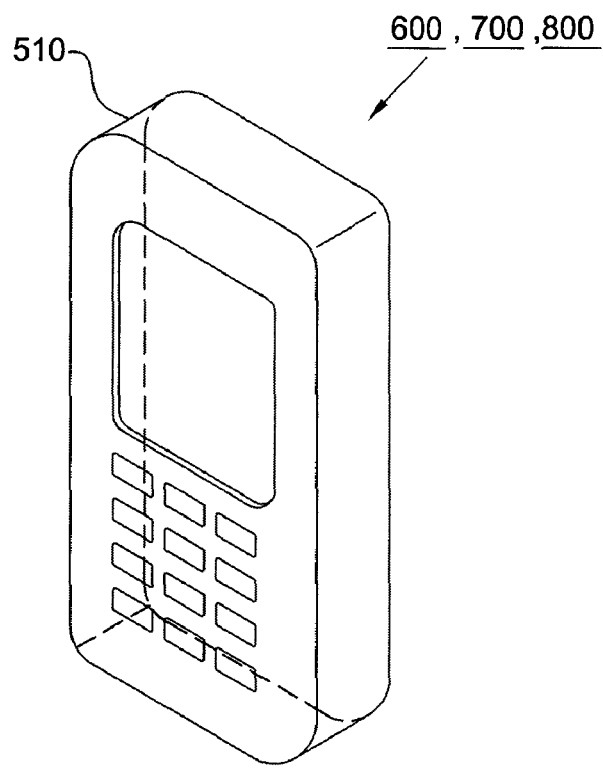
FIG. 5 is an overview of the electronic device of the present invention.
Figure 6A:
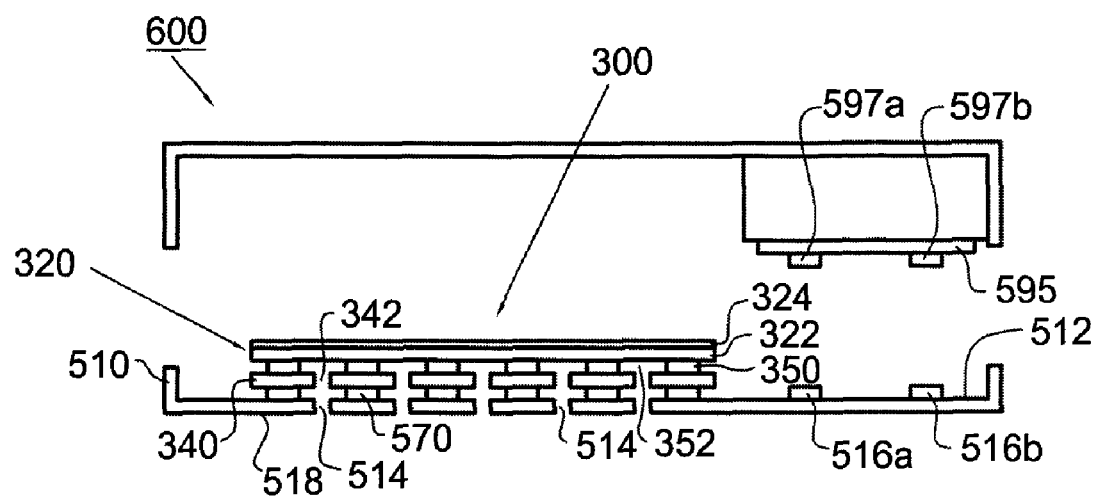
FIG. 6a is a cross-sectional view of the electronic device according to the first type of the first embodiment of the present invention, wherein the back cover is separated from the body of the electronic device.
Figure 6B:
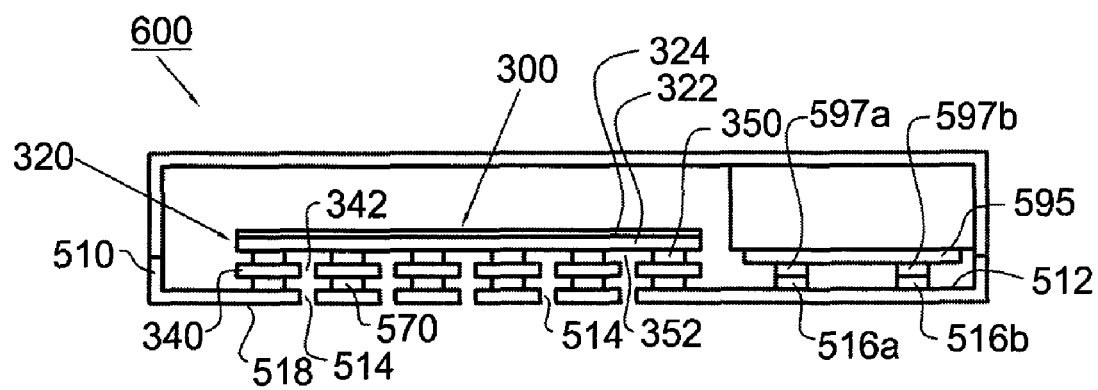
FIG. 6b is a cross-sectional view of the electronic device according to the first type of the first embodiment of the present invention, wherein the back cover is attached to the body of the electronic device.

Referring to FIGS. 5, 6a and 6b, the electronic device 600 according to the first type of the first embodiment of the present invention includes a housing 510 having a plurality of through openings 514 extending from the inner surface 512 through to the outer surface 518 thereof. The electro-acoustic transducer 300 is disposed on the inner surface 512 of the housing 510, wherein the conductive plate 340 of the electro-acoustic transducer 300 is disposed on the inner surface 512 of the housing 510 and the electret diaphragm 320 is disposed on the conductive plate 340. In addition, a plurality of spacers 570 corresponding to the fluorescent spacers 350 is positioned between the conductive plate 340 and the inner surface 512 of the housing 510 to prevent the conductive plate 340 from movement to cause damage on the housing 510.

According to the present invention, the sounds made by the electret diaphragm 320 can travel through the openings 514 to leave the housing 510 of the electronic device 600 so that a user can hear the sounds. Furthermore, the light generated by the fluorescent layer 350 can also travel through the openings 514 to leave the housing 510 so that a user can see the light. To have more light leave the housing 510, it is preferred that the housing 510 is transparent.

Figure 7A:
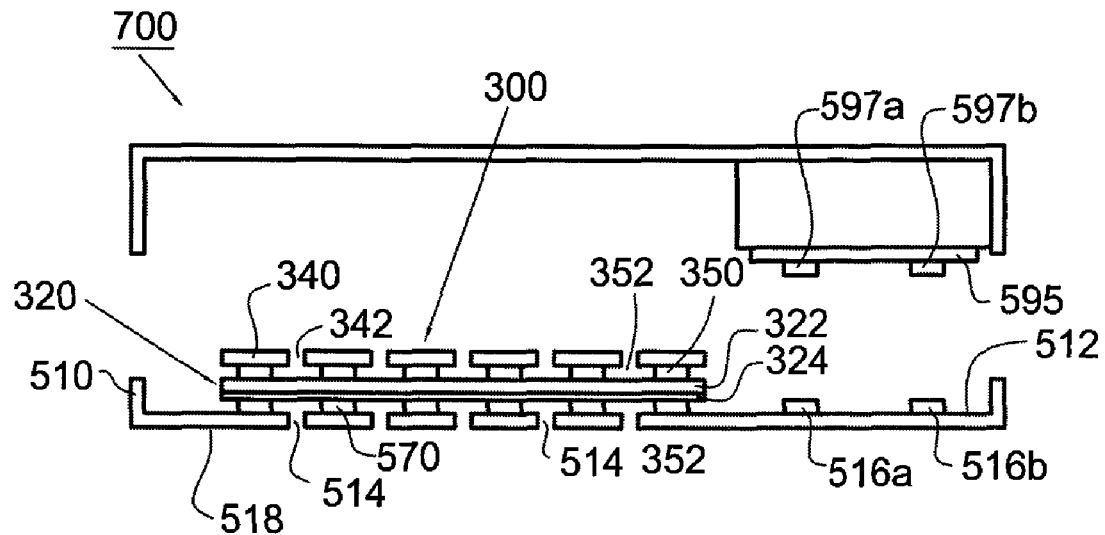
FIG. 7a is a cross-sectional view of the electronic device according to the second type of the first embodiment of the present invention, wherein the back cover is separated from the body of the electronic device.
Figure 7B:
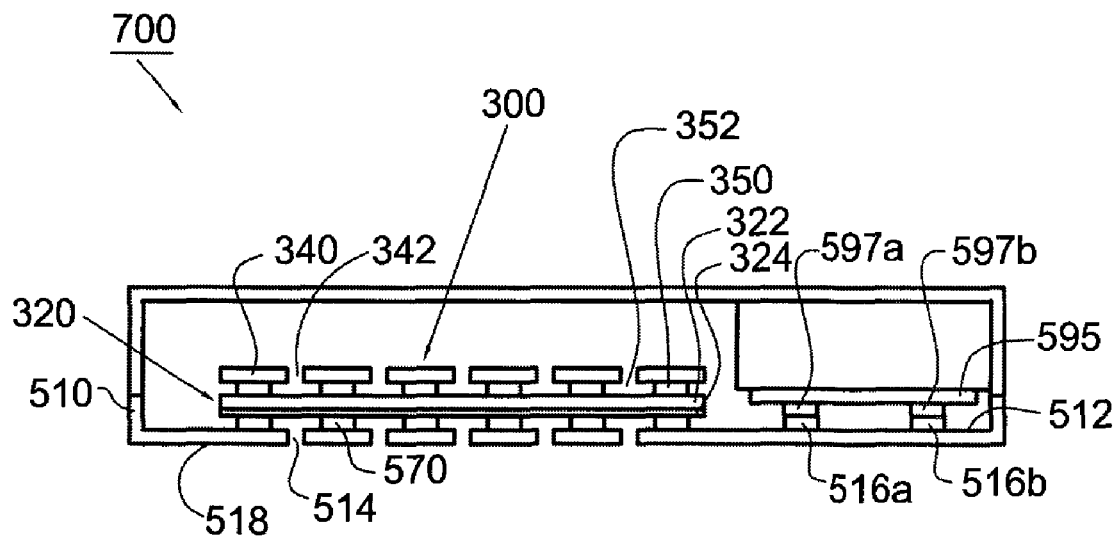
FIG. 7b is a cross-sectional view of the electronic device according to the second type of the first embodiment of the present invention, wherein the back cover is attached to the body of the electronic device.

Referring to FIGS. 5, 7a and 7b, the electronic device 700 according to the second type of the first embodiment of the present invention also includes the transparent housing 510 and the electro-acoustic transducer 300 disposed on the inner surface 512 of the housing 510. However, the electronic device 700 is different from the electronic device 600 in that the electret diaphragm 320 in the electronic device 700 is disposed on the inner surface 512 of the housing 510 and the conductive plate 340 is disposed above and on the electret diaphragm 320. The spacers 570 are positioned between the electrode layer 324 and the inner surface 512 of the housing 510 to prevent the electrode layer 324 from movement to cause damage on the housing 510.

According to the present invention, the sounds made by the electret diaphragm 320 can travel through the openings 514 to leave the housing 510 of the electronic device 700 so that a user can hear the sounds. Furthermore, the light generated by the fluorescent layer 350 can also travel through the openings 514 to leave the housing 510 of the electronic device 700 so that a user can see the light.

Figure 8A:
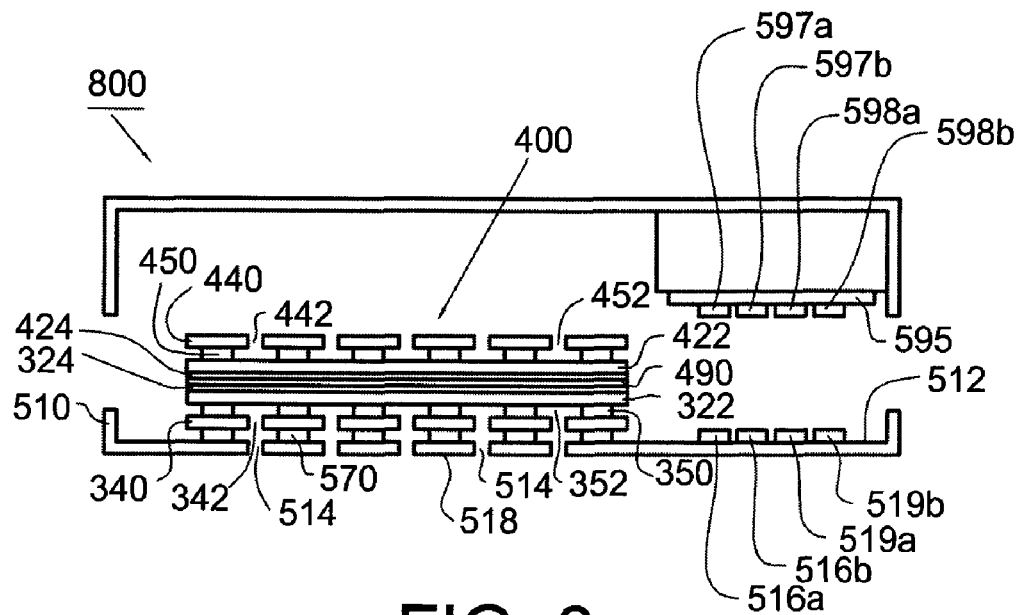
FIG. 8a is a cross-sectional view of the electronic device according to the second embodiment of the present invention, wherein the back cover is separated from the body of the electronic device.
Figure 8B:
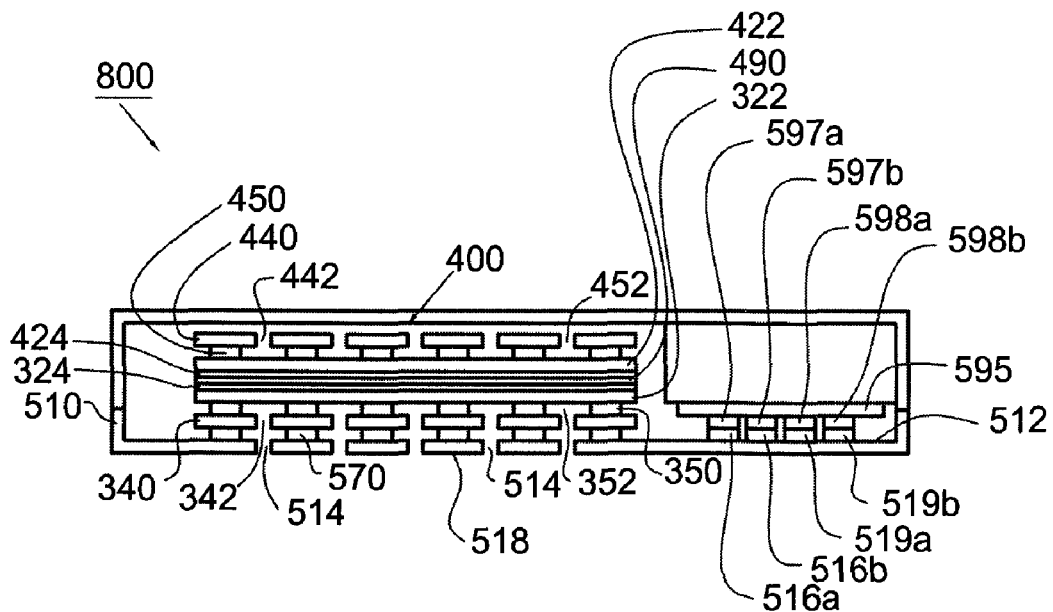
FIG. 8b is a cross-sectional view of the electronic device according to the second embodiment of the present invention, wherein the back cover is attached to the body of the electronic device.

Referring to FIGS. 5, 8a and 8b, the electronic device 800 according to the second embodiment of the present invention includes the transparent housing 510, spacers 570 and the electro-acoustic transducer 400 disposed on the inner surface 512 of the housing 510, wherein the conductive plate 340 of the electro-acoustic transducer 400 is disposed on the inner surface 512 of the housing 510 and the electret diaphragm 320 is stacked and disposed on the conductive plate 340. The spacers 570 are positioned between the conductive plate 340 and the inner surface 512 of the housing 510 to prevent the conductive plate 340 from movement to cause damage on the housing 510.

Similarly, the sounds made by the electret diaphragms 320 and 420 can travel through the openings 514 to leave the housing 510 of the electronic device 800 so that a user can hear the sounds. Furthermore, the light generated by the fluorescent layers 350 and 450 can also travel through the openings 514 to leave the housing 510 of the electronic device 800 so that a user can see the light.

Figure 9A:
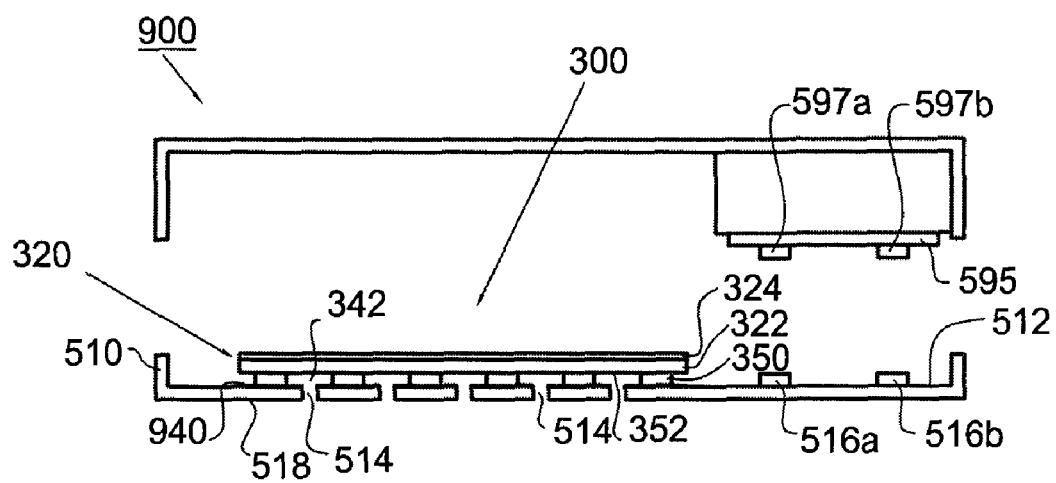
FIG. 9a is a cross-sectional view of the electronic device according to the third embodiment of the present invention, wherein the back cover is separated from the body of the electronic device.
Figure 9B:
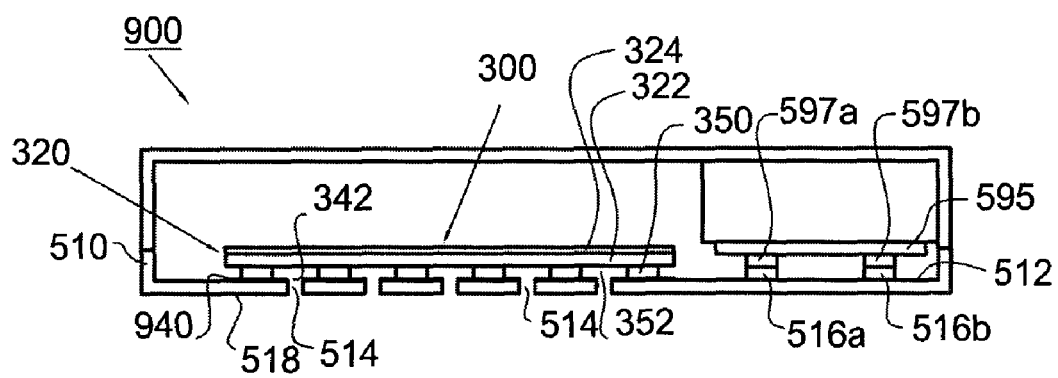
FIG. 9b is a cross-sectional view of the electronic device according to the third embodiment of the present invention, wherein the back cover is attached to the body of the electronic device.

Referring to FIGS. 5, 9a and 9b, the electronic device 900 according to the third embodiment of the present invention is substantially the same as the electronic device 600 of FIGS. 6a and 6b, where identical reference numerals have been used when designating substantially identically elements that are common to the figures. Any further illustrations of the identical elements are omitted herein. The difference between them is that the electro-acoustic transducer 300 of the electronic device 900 includes a conductive layer 940 coated on the inner surface 512 of the housing 510 to replace the conductive plate 340 and does not have the spacers 570. Similarly, to have the electro-acoustic transducer 300 of the electronic device 900 work, an electrical signal has to be applied to the conductive layer 940 and the electrode layer 324 so that the electret diaphragm 320 can vibrate to make sounds in accordance with the electrical signal.

Figure 10A:
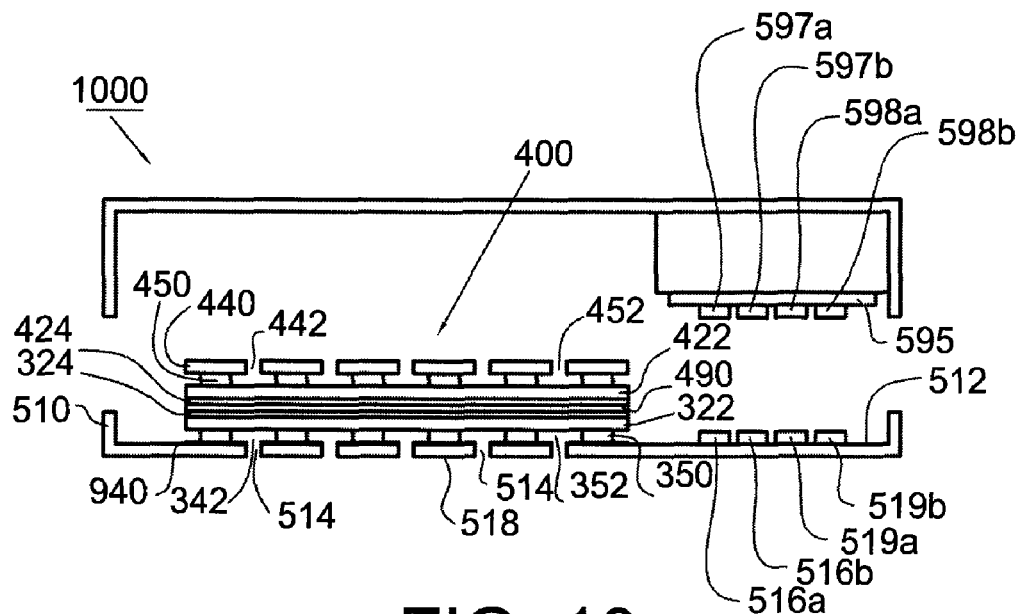
FIG. 10a is a cross-sectional view of the electronic device according to the fourth embodiment of the present invention, wherein the back cover is separated from the body of the electronic device.
Figure 10B:
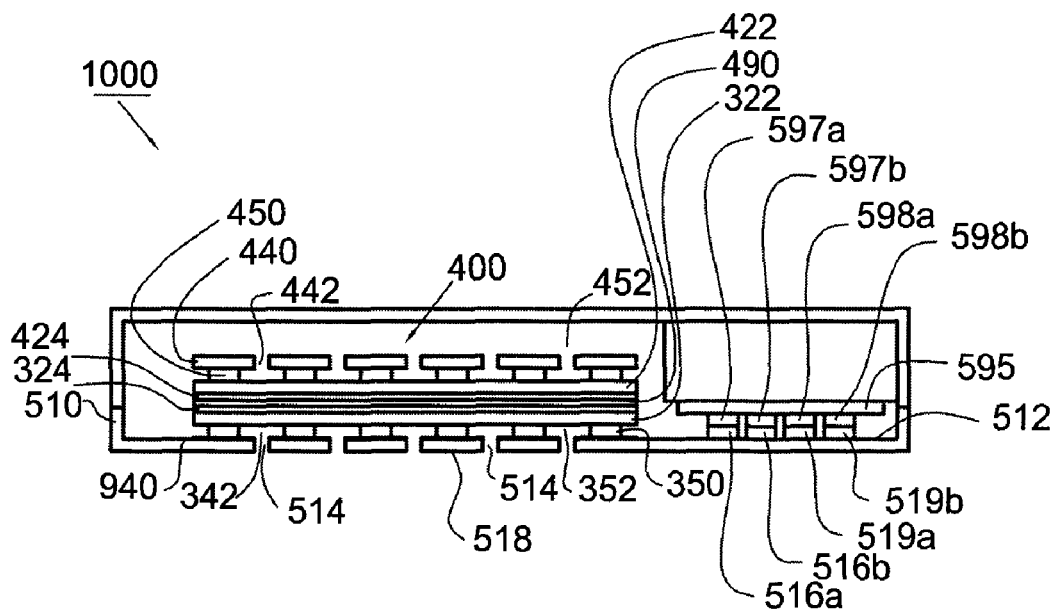
FIG. 10b is a cross-sectional view of the electronic device according to the fourth embodiment of the present invention, wherein the back cover is attached to the body of the electronic device.

Referring to FIGS. 5, 10a and 10b, the electronic device 1000 according to the fourth embodiment of the present invention is substantially the same as the electronic device 800 of FIGS. 8a and 8b, where identical reference numerals have been used when designating substantially identically elements that are common to the figures. Any further illustrations of the identical elements are omitted herein. The difference between them is that the electro-acoustic transducer 400 of the electronic device 1000 includes a conductive layer 940 coated on the inner surface 512 of the housing 510 to replace the conductive plate 340 and does not have the spacers 570. Similarly, to have the electro-acoustic transducer 400 of the electronic device 1000 work, a first electrical signal has to be applied to the conductive plate 440 and the electrode layer 324 and a second electrical signal is applied to the electrode layer 424 and the conductive layer 944 so that the electret diaphragms 320 and 420 can vibrate to make sounds in accordance with the electrical signals.

The electro-acoustic transducers 300, 400 of the electronic devices 600, 700, 800, 900, 1000 are disposed on the housing 510 and the housing 510 can be a part of a front cover, side cover or back cover of the electronic devices 600, 700, 800, 900, 1000. It will be appreciated that the electro-acoustic transducers 300, 400 have to be electrically connected to other elements, such as circuit boards in the electronic devices 600, 700, 800, 900, 1000 in order to work. Referring back to FIGS. 6a, 6b, 7a, 7b, 8a, 8b, 9a, 9b, 10a and 10b, when the electro-acoustic transducers 300, 400 are mounted on the user-detachable back covers 510, an electrical terminal 516a disposed on the inner surface 512 of the back cover 510 is electrically connected to the conductive plates 340 or the conductive layer 940, and an electrical terminal 516b disposed on the inner surface 512 of the back covers 510 is electrically connected to the electrode layer 324. In addition, electrical terminals 519a and 519b disposed on the inner surface 512 of the back cover 510 of the electronic devices 800, 1000 are electrically connected to the conductive plate 440 and the electrode layer 424 of the electro-acoustic transducer 400, respectively. As shown in FIGS. 6b, 7b, 8b, 9b and 10b, when the back covers 510 are attached to the body of the electronic devices 600, 700, 800, 900, 1000, the electrical terminals 516a and 516b are respectively brought into electrical contact with the electrical terminals 597a and 597b on the circuit boards 595 of the electronic devices 600, 700, 800, 900, 1000 and the electrical terminals 519a and 519b (shown in FIGS. 8b and 10b) are respectively brought into electrical contact with the electrical terminals 598a and 598b on the circuit board 595 of the electronic devices 800, 1000. In this manner, the electrical signals can be applied to the conductive plates 340, 440, the conductive layer 940 and electrode layers 324, 424 thereby the electret diaphragms 320, 420 can vibrate to make sounds in accordance with the electrical signals.

According to the present invention, the spacers of the electro-acoustic transducers can be discrete spacers. However, it should be understood that the above discrete spacers can be replaced with a sheet having a plurality of openings formed thereon.

The electronic devices of the present invention can be portable electronic devices, such as mobile phones, personal digital assistants (PDAs) or laptop computers. Since the electroacoustic transducers of the present invention integrate the function of making sound and generating light together, the available space inside the electronic devices can be increased. Furthermore, the electro-acoustic transducers of the present invention are comprised of a lot of voice units arranged in an array. Accordingly, their voice performances are better than conventional piezoelectric loudspeakers.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:
1. An electro-acoustic transducer, comprising:
  a first conductive plate having a plurality of openings;
  a first electret diaphragm being disposed on the first conductive plate and having a first film body and a first electrode layer, wherein the first film body has static charges carried and the first electrode layer is formed on the upper surface of the first film body; and
  a first fluorescent layer disposed between the lower surface of the first film body and the first conductive plate.

2. The electro-acoustic transducer as claimed in claim 1, wherein the first fluorescent layer is comprised of a plurality of fluorescent spacers.

3. The electro-acoustic transducer as claimed in claim 1, wherein the first fluorescent layer has a plurality of openings respectively opposite to the openings of the first conductive plate.

4. The electro-acoustic transducer as claimed in claim 1, wherein the first electrode layer and the first conductive plate are electrically connected to a first electrical signal.

5. The electro-acoustic transducer as claimed in claim 1, further comprising:
   a second electret diaphragm being disposed on the first electrode layer of the first electret diaphragm and having a second film body and a second electrode layer, wherein the second film body has static charges carried and the second electrode layer is formed on the lower surface of the second film body;
   an isolation layer disposed between the first and second electrode layers;
   a second conductive plate being disposed on the second film body and having a plurality of openings; and
   a second fluorescent layer disposed between the upper surface of the second film body and the second conductive plate.

6. The electro-acoustic transducer as claimed in claim 5, wherein the second fluorescent layer has a plurality of openings respectively opposite to the openings of the second conductive plate, and the second electrode layer and the second conductive plate are electrically connected to a second electrical signal.

7. The electro-acoustic transducer as claimed in claim 1, wherein the first electrode layer and the first film body are transparent.

8. The electro-acoustic transducer as claimed in claim 5, wherein the first electrode layer, the second electrode layer, the first film body and the second film body are transparent.

9. An electronic device, comprising:
   a housing having an inner surface and an outer surface; and
   an electro-acoustic transducer being disposed on the housing and comprising:
     a first conductive plate being disposed on the inner surface of the housing and having a plurality of openings;
     a first electret diaphragm being disposed on the first conductive plate and having a first film body and a first electrode layer, wherein the first film body has static charges carried and the first electrode layer is formed on the upper surface of the first film body; and
     a first fluorescent layer disposed between the lower surface of the first film body and the first conductive plate.

10. The electronic device as claimed in claim 9, wherein the housing has a plurality of openings, and the electro-acoustic transducer is disposed on the inner surface of the housing.

11. The electronic device as claimed in claim 9, wherein the first electrode layer and the first conductive plate are electrically connected to a first electrical signal.

12. The electronic device as claimed in claim 9, further comprising:
   a second electret diaphragm being disposed on the first electrode layer of the first electret diaphragm and having a second film body and a second electrode layer, wherein the second film body has static charges carried and the second electrode layer is formed on the lower surface of the second film body;
   an isolation layer disposed between the first and second electrode layers;
   a second conductive plate being disposed on the second film body and having a plurality of openings; and
   a second fluorescent layer disposed between the upper surface of the second film body and the second conductive plate.

13. The electronic device as claimed in claim 12, wherein the second fluorescent layer has a plurality of openings respectively opposite to the openings of the second conductive plate.

14. The electronic device as claimed in claim 9, further comprising:
   a plurality of spacers disposed between the inner surface of the housing and the first conductive plate.

15. An electronic device, comprising:
   a housing having an inner surface and an outer surface; and
   an electro-acoustic transducer being disposed on the housing and comprising:
     an electret diaphragm being disposed on the inner surface of the housing and having a film body and an electrode layer, wherein the film body has static charges carried and the electrode layer is formed on the lower surface of the film body;
     a conductive plate being disposed on the electret diaphragm and having a plurality of openings; and
     a fluorescent layer disposed between the upper surface of the film body and the conductive plate.

16. The electronic device as claimed in claim 15, wherein the housing has a plurality of openings, and the electro-acoustic transducer is disposed on the inner surface of the housing.

17. The electronic device as claimed in claim 15, wherein the electrode layer and the conductive plate are electrically connected to an electrical signal.

18. An electronic device, comprising:
   a housing having an inner surface and an outer surface; and
   an electro-acoustic transducer disposed on the housing, comprising:
     a conductive layer disposed on the inner surface of the housing;
     a first electret diaphragm being disposed on the conductive layer and having a first film body and a first electrode layer, wherein the first film body has static charges carried and the first electrode layer is formed on the upper surface of the first film body; and
     a first fluorescent layer disposed between the lower surface of the first film body and the conductive layer.

19. The electronic device as claimed in claim 18, wherein the housing has a plurality of openings, and the electro-acoustic transducer is disposed on the inner surface of the housing.

20. The electronic device as claimed in claim 18, wherein the first electrode layer and the conductive layer are electrically connected to a first electrical signal.

* * * * *